June 2, 1942. J. J. BUDA, JR 2,285,194
ELECTRIC TESTING DEVICE FOR CONTACTS
Filed Oct. 25, 1941 2 Sheets-Sheet 1
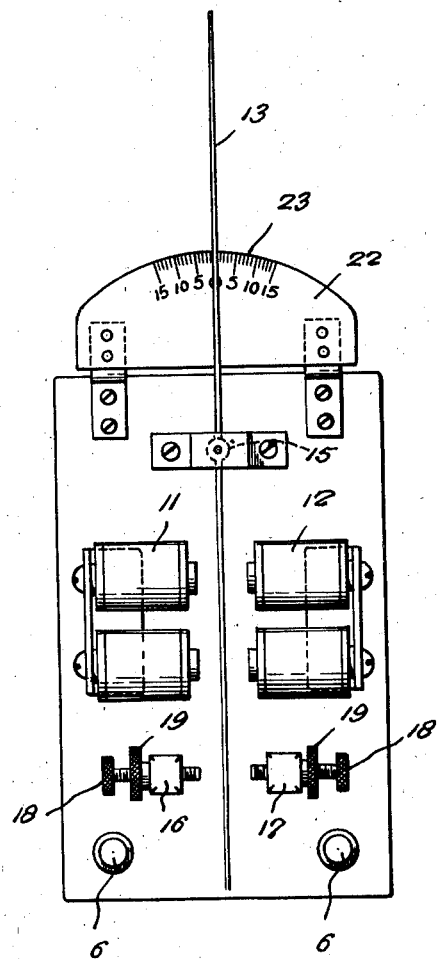
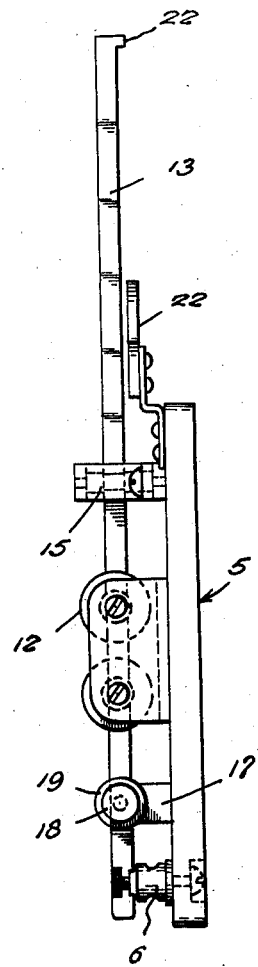
Inventor
John J. Buda, Jr.,

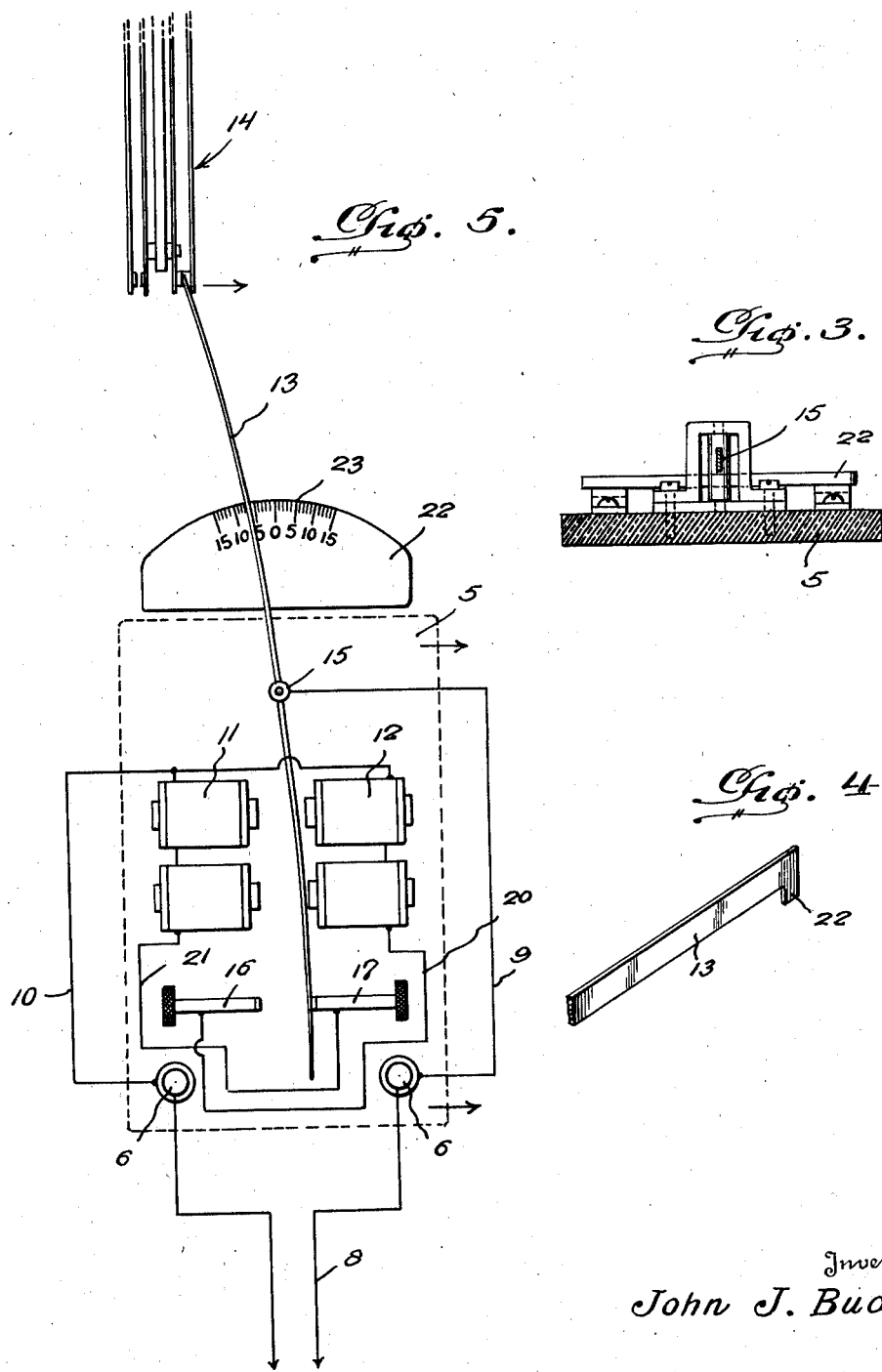

Patented June 2, 1942

2,285,194

UNITED STATES PATENT OFFICE 2,285,194

ELECTRIC TESTING DEVICE FOR CONTACTS

John J. Buda, Jr., Brookfield, Ill.

Application October 25, 1941, Serial No. 416,575

3 Claims. (Cl. 265—18)

This invention relates to gauges for testing contacts of electric magnetic relays for telephones and similar devices and other electric appliances using contacts in general electric signalling.

The testing devices now in use for the above purposes are difficult to employ and place considerable eye strain on the operator as it is necessary for the operator to watch both the contact when it breaks from its companion contact and the scale of the testing device which is usually arranged a distance from the contacts in order to determine when a contact is adjusted properly.

The present invention has for its primary object the provision of a device which will eliminate eye strain on the operator and permit the operator to adjust a contact quicker and more accurately by providing both audible and visible indications, only requiring the operator to watch a scale reading on the device and to listen for the audible indication in order to determine when a contact is properly adjusted or has a correct tension.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which Figure 1 is a top plan view illustrating a gauge constructed in accordance with my invention.

Figure 2 is an edge elevation illustrating the gauge.

Figure 3 is a transverse sectional view illustrating the pivotal mounting of the vibrator reed of the gauge on the base of said gauge.

Figure 4 is a fragmentary perspective view illustrating a portion of the vibrator reed.

Figure 5 is a diagrammatical view illustrating the association of the gauge with contacts of a relay or similar electric device.

Referring in detail to the drawings, the numeral 5 indicates an insulated portable base which can be easily gripped within a person's hand and held in operative position with respect to contacts of an electric appliance. Terminal posts 6 are mounted on the base and are electrically connected to feed lines 8 of an electric source (not shown). This electric source may be in the form of a battery provided with a suitable control switch (not shown).

Conductors 9 and 10 are connected to the terminal posts 6 and the conductor 10 is connected to pairs of electromagnets 11 and 12 mounted on the base 5. The pairs of electromagnets are oppositely disposed and operating therebetween is a vibrator reed 13, one end of which extends a considerable distance beyond one end of the base to engage with a contact of a relay 14 diagrammatically shown in Figure 5. The reed 13 is pivotally mounted on the base 5, as at 15, which pivot provides a terminal and has connected thereto the conductor 9.

Arranged on the base 5 between the pairs of electromagnets and the terminal posts 6 are opposed adjustable stops 16 and 17 each including a set screw 18 and a lock nut 19. A conductor 20 connects the pair of electromagnets 12 to the adjustable stop 16 and a conductor 21 connects the pair of electromagnets 11 to the adjustable stop 17.

Arranged at one end of the base 5 is a scale plate 22 bearing a scale 23 over which operates the vibrator reed 13. The reading of the scale 23 is from zero to 15 in opposite directions. However, other scale markings may be employed if desired.

It is to be understood that the purpose of the electromagnets 11 and 12 and the electric circuit therefor is to cause vibration of the reed 13, the vibration tone of the reed varying by the amount of tension on the reed and the amount of tension on the reed may be approximately determined by noting its position on the scale plate.

Further it is to be understood that the magnets 11 are only energized when the reed is engaged with the contact 17 and the magnets 12 are energized when the reed engages the contact 16. This is accomplished by the way the contacts 16 and 17 are wired to the magnets 11 and 12 and the latter are deenergized when the reed is over zero on the scale and equally spaced from the contacts 16 and 17.

It is to be understood that when employing this device for testing the tension and the adjusting of contacts of relays or similar devices, such devices when in use are held in a relatively fixed position. The free end of the reed 13 which is offset, as shown at 22, is brought into engagement with the movable contact of the relay, as shown in Figure 5, the base being supported by a hand of the operator. To make the test, the electromagnets 11 are energized by closing the electric circuit from the source (not shown) and bringing the reed into position of engaging the contact 17 which sets up a vibration in the reed 13. The operator then tensions the reed by moving the device bodily with respect to the device being tested with the reed in engagement with the contact in the direction indicated by the arrow in Figure 5, watching the scale reading. This is continued until the contact engaged by the reed breaks from its companion contact. The operator being trained to the tones of the vibrator reed, can detect the change in tone of the reed the instant said contacts become disengaged from each other, and noting the scale reading at this time may then determine if the tension of the contact is proper for the correct functioning of the relay or other electric appliance being tested.

By referring to Figure 5 is will be seen that the relay is composed of pairs of contacts, the reed being in engagement with a contact of one of the pairs and moved in the direction indicated by the arrow for making a test.

However, to make a test on the movable contact of the other pair of contacts of the relay, the reed 13 is placed in engagement with the movable contact of the latter-named pairs of contacts and is engaged with the contact 16, the device is then moved in an opposite direction carrying out the same operation of the reading of the scale and listening to the tones of the reed as described heretofore.

While I have shown and described the preferred embodiment of my invention, it will be understood that minor changes in construction, combination and arrangement of parts may be made without departing from the spirit and scope of the invention as claimed.

Having thus described the invention, what I claim is:

1. In a contact testing device, a base, a vibrator reed carried by the base and adapted to give variations in tone and have the free end thereof manually engaged with a contact to be tested, means carried by said base for vibrating said reed, and a scale associated with the reed to indicate the amount of tension placed on the contact by said reed, the reed indicating by tone when disengagement of the contact from its companion contact takes place by the increased tension placed thereon manually through said reed.

2. In a contact testing device, a vibrator reed adapted to give variations in tone and have the free end thereof manually engaged with a contact to be tested, a base having said reed pivotally mounted thereon, electrical means for vibrating said reed and mounted on said base, and a scale associated with the reed and carried by the base to indicate the amount of tension placed on the contact by said reed and the manual movement of the base relative to the contact, the reed indicating by tone when disengagement of the contact from its companion contact takes place by the increased tension placed thereon manually through said reed.

3. In a contact testing device, a vibrator reed adapted to give variations in tone and have the free end thereof manually engaged with a contact to be tested, a base pivotally supporting said reed and manually supported and movable, pairs of electromagnets on said base with a portion of the reed arranged therebetween and connected in an electric circuit, adjustable stops on the base at opposite sides of said portion of the reed and connected in the electric circuit and a scale plate mounted on the base and having graduations over which the reed is movable to indicate the tension placed on the contact by the reed through the manual movement of the base relative to the contact, the reed indicating by tone when the disengagement of the contact from a companion contact takes place due to increased tension placed thereon manually through the manual movement of the base with respect to the contact.

JOHN J. BUDA, Jr